United States Patent [19]

van Kreuningen

[11] Patent Number: 4,513,335

[45] Date of Patent: Apr. 23, 1985

[54] 8-TRACK CASSETTE ADAPTOR

[75] Inventor: Rudolf van Kreuningen, Torrance, Calif.

[73] Assignee: Kraco Enterprises, Compton, Calif.

[21] Appl. No.: 391,924

[22] Filed: Jun. 24, 1982

[51] Int. Cl.³ ............................................. G11B 15/00
[52] U.S. Cl. ...................................................... 360/94
[58] Field of Search ................................ 360/94, 128; 242/198-199

[56] References Cited

U.S. PATENT DOCUMENTS

| | | |
|---|---|---|
| 3,644,684 | 2/1972 | Tsuji . |
| 3,662,123 | 5/1972 | Huber . |
| 3,753,566 | 8/1973 | Yoshida . |
| 3,777,073 | 12/1973 | Kokubo . |
| 3,821,808 | 6/1974 | Wada et al. . |
| 3,864,743 | 2/1975 | Staar . |
| 3,950,785 | 4/1976 | Findley . |
| 3,964,099 | 5/1976 | Sato . |
| 4,183,477 | 1/1980 | Iwase et al. . |
| 4,201,356 | 5/1980 | Schoettle et al. . |
| 4,216,509 | 8/1980 | Sato et al. . |

*Primary Examiner*—John H. Wolff
*Attorney, Agent, or Firm*—Fulwider, Patton, Rieber, Lee & Utecht

[57] ABSTRACT

A plug-in adaptor for playing standard cassettes in an 8-track stereo cartridge player, wherein the mechanical power for playing and rewinding the tape in the cassette is provided by the capstan of the 8-track player. A pickup head in the adaptor senses the magnetic signals from the cassette tape as it is driven past the pickup head, and these signals are amplified by an adaptor amplifier and supplied to a magnetic coupler in the adaptor adjacent the 8-track tape playback head, which receives the signals for transmission to the electronics and speakers of the 8-track unit. Electric power for the adaptor amplifier is drawn from an 8-track tape sensor ordinarily used to sense the end of an 8-track tape.

14 Claims, 11 Drawing Figures

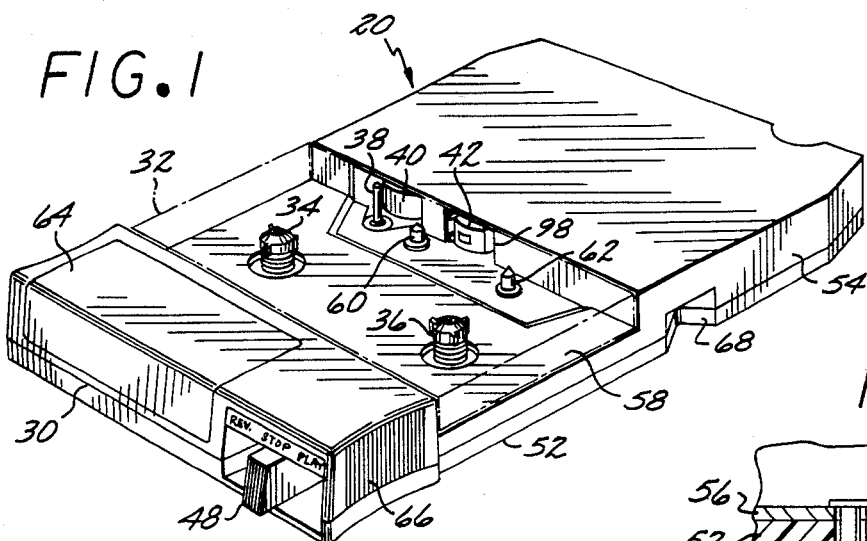
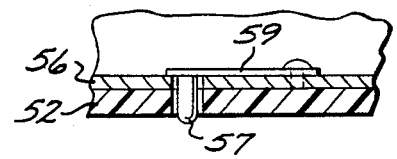
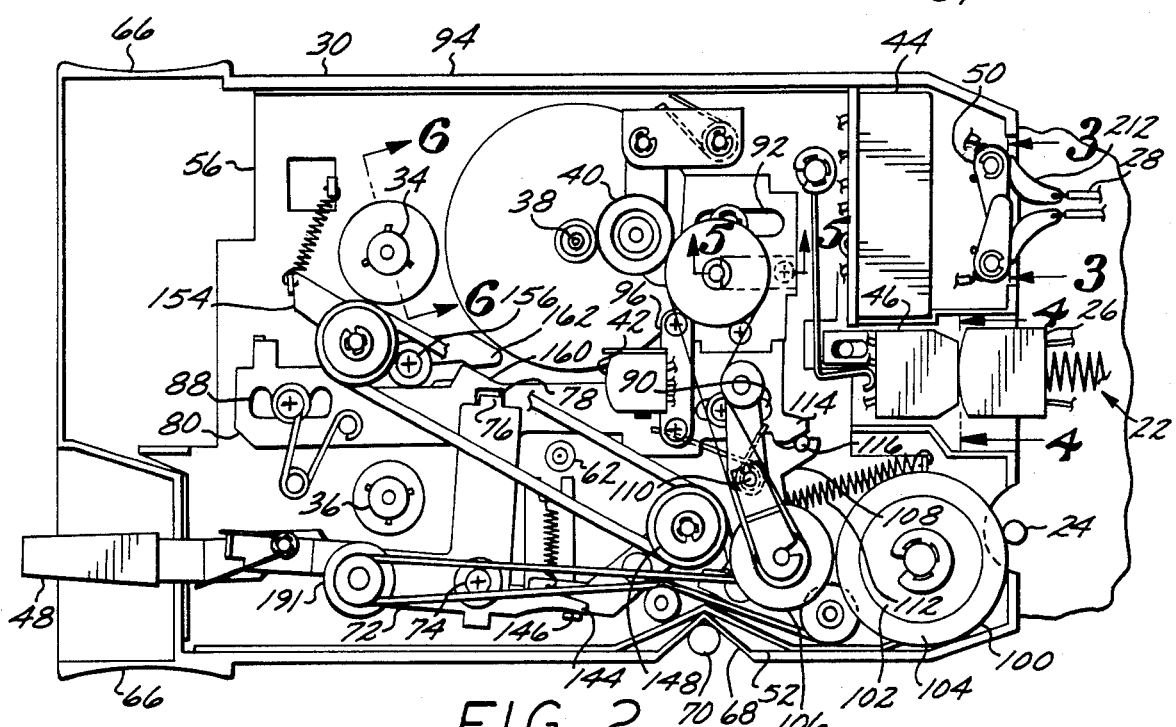
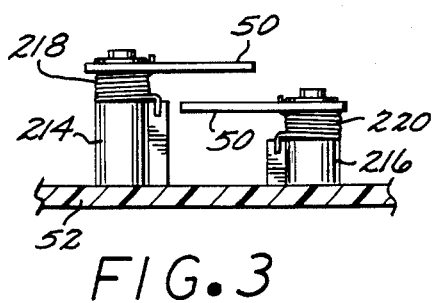
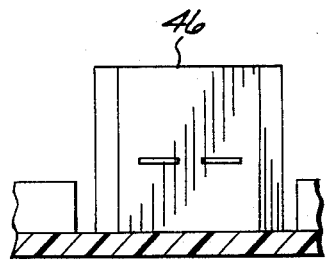

8-TRACK CASSETTE ADAPTOR

BACKGROUND OF THE INVENTION

This invention relates generally to tape players, and more particularly to a cassette adaptor for playing standard cassette tapes in an 8-track tape player.

Tape recording has become an important and popular means for storing and transmitting music and other audio signals, and many persons enjoy entertainment and information made available to them on tapes. Tapes are available in reel-to-reel and cartridge forms, but the cartridges have become increasingly popular due to their relative compactness, durability and simplicity of use.

Two formats of cartridge tapes are widely available, a standard "cassette" measuring approximately $2\frac{1}{2}$ inches by 4 inches by $\frac{3}{8}$ inch, and a somewhat larger "8-track cartridge" measuring approximately $5\frac{1}{4}$ inches by 4 inches by $\frac{7}{8}$ inch. Tape players for the two formats receive the cassette or cartridge in a receptacle therein and drive the tape past a playback head, which senses the signals recorded on the tape. The signals are then amplified and played through speakers. Since the cassette and cartridge are of different sizes, neither can ordinarily be played on a player designed for the other.

Many persons have purchased 8-track tape players and collections of 8-track tape cartridges, but for a variety of reasons also wish to be able to play cassette tapes. One solution to this problem is to purchase both an 8-track player and a standard cassette player, but this approach is expensive and wasteful due to the significant duplication of the most expensive sound amplification and speaker components in the two systems. Additionally, this solution may not be practical because of space limitations, as for example musical systems placed in automobiles.

Another solution is to provide an adaptor whereby a cassette tape may be played in an 8-track tape player, so that the available amplification and speaker systems of the 8-track player may be used. In a prior approach to a cassette adaptor, a motor in the adaptor powered through electrical wires leading to the 8-track player drives the cassette tape past a tape head. The signals from the tape head are then transmitted by a second set of wires to the amplifier in the 8-track player. This adaptor is bulky and expensive, since an electrical motor in the adaptor is required to drive the tape. At least two sets of electrical wires must be connected from the adaptor to the 8-track player, with the result that installation may be costly and inconvenient. Further, with this prior adaptor it is difficult to switch between 8-track cartridge and cassette playing modes.

Accordingly, there has been a need for a cassette adaptor for 8-track tape players, whereby the cassette may be played through the electronics and speakers of the 8-track system, yet having a minimum bulk, cost, cross hookup of components, and duplication of expensive components. The present invention fulfills this need, and further provides related advantages.

SUMMARY OF THE INVENTION

The present invention provides an adaptor for playing standard cassette tapes in an 8-track tape player, wherein an adaptor frame holding a cassette tape is dimensioned so that it may be inserted directly into the 8-track tape player. The adaptor receives mechanical power for driving the cassette tape from a capstan of the 8-track player and electrical power for an adaptor amplifier from a tape sensor of the 8-track player, and transmits a signal from the cassette tape to an existing tape playback head of the 8-track player. The adaptor is inserted directly into an 8-track cartridge receptacle of the 8-track player, requires no separate electrical or mechanical hookups, is approximately of the same dimensions as an 8-track cartridge, and is relatively inexpensive due to the absence of duplication of expensive components with the 8-track player.

In accordance with the invention, the adaptor frame dimensioned for insertion into the 8-track cartridge receptacle has a pickup head for sensing the signal from a cassette tape as the tape is moved past the pickup head, and a drive mechanism for driving the tape past the pickup head and for rewinding the tape, without the need for any motor in the frame. Electronic circuitry mounted in the frame amplifies the signal picked up by the pickup head and transmits the signal to an adaptor magnetic coupler positioned adjacent the 8-track playback head, so that the signal is transmitted therethrough into the electronics and speakers of the 8-track player without the need for any separate electrical hookup. In a preferred embodiment, the tape is selectively driven past the pickup head or rewound by a mechanism wherein a mechanical linkage positions a series of wheels, pulleys and drive belts to deliver power from an 8-track capstan to an adaptor capstan, pinch roller and takeup spindle for playing the tape, and to a rewind spindle for rewinding the tape. The low level of electrical power required for the adaptor amplifier of the preferred embodiment is supplied by the tape sensor of the 8-track player through contacts on the adaptor frame.

It will be appreciated from the foregoing that the present invention represents a significant advance in the practical utilization of 8-track stereo players. With the adaptor of the present invention, standard cassette tapes may be played through the 8-track player using only an insertable unit not requiring any separate electrical or mechanical hookups to the 8-track player. The power necessary for the adaptor to function is drawn directly from mechanical and electrical sources available at the back of the 8-track cartridge receptacle. Consequently, the adaptor is compact, easy to use and store, and has minimum duplication of components with the 8-track player to reduce costs.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate an embodiment of the invention. In such drawings:

FIG. 1 is a perspective view of a cassette adaptor embodying the features of this invention;

FIG. 2 is an enlarged top plan view of the adaptor of FIG. 1, with the cover removed and the mechanism positioned to receive a cassette;

FIG. 3 is an enlarged fragmented elevational view taken generally on the line 3—3 of FIG. 2;

FIG. 4 is an enlarged fragmented elevational view taken generally on the line 4—4 of FIG. 2;

FIG. 5 is an enlarged fragmented sectional view taken generally on the line 5—5 of FIG. 2;

DETAILED DESCRIPTION OF THE PREFERRED EMBODIMENT

Figure 6:
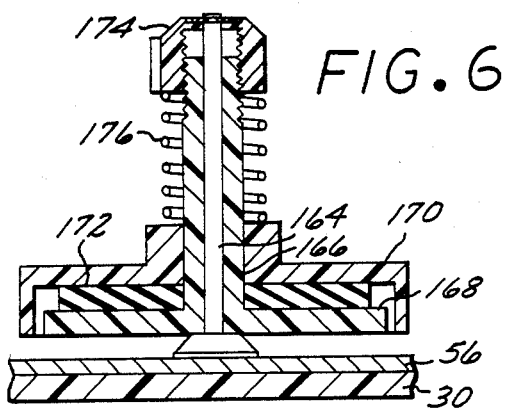
FIG. 6 is an enlarged fragmented sectional view taken generally on the line 6—6 of FIG. 2.

As is shown in the drawings for purposes of illustration, the present invention is embodied in an 8-track cassette adaptor, indicated generally by the numeral 20, whereby a standard tape cassette may be played utilizing an 8-track tape player, the relevant portion of which is generally indicated by the numeral 22 in FIG. 2. The adaptor 20 is dimensioned for insertion into a cartridge receptacle (not shown) of the 8-track player, and in a fully inserted position the adaptor 20 contacts an 8-track capstan 24, an 8-track tape playback head 26, and an 8-track tape sensor 28 positioned in the rear wall of the receptacle. The 8-track capstan 24 supplies the mechanical power for playing and rewinding the cassette tape, and the 8-track tape sensor 28 supplies electrical power for amplifying the signal to a level suitable for transmission to the 8-track tape playback head 26.

Because the described embodiment of the invention includes several interlinked subsystems, a broad description of the functioning of the embodiment will first be presented, with a more-detailed description of each subsystem following. In accordance with the present invention, the adaptor 20 generally includes a box-like adaptor frame 30 for receiving a tape cassette 32 (shown in phantom lines in FIG. 1) with a pair of spindles 34 and 36 engaging a takeup reel and a rewind reel (not shown) of the cassette 32. An adaptor capstan 38 and a rubber adaptor pinch roller 40 drive the tape in the cassette 32 past an adaptor pickup head 42 for sensing the magnetic signals on the tape. The magnetic signals are amplified by an adaptor amplifier 44 and transmitted to the 8-track playback head 26 through an adaptor magnetic coupler 46 positioned adjacent the playback head 26.

Figure 8:
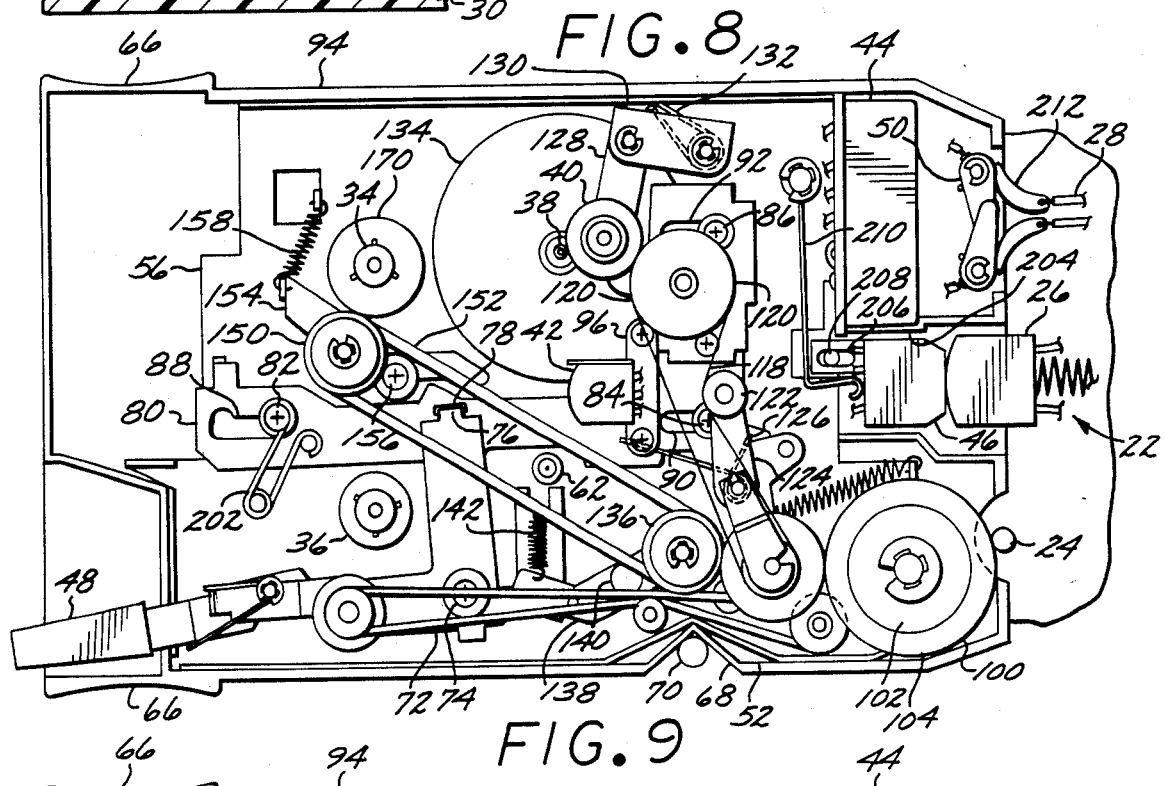
FIG. 8 is an enlarged top plan view generally similar to FIG. 2, except that the mechanism is selectively positioned to play a cassette tape.
Figure 9:
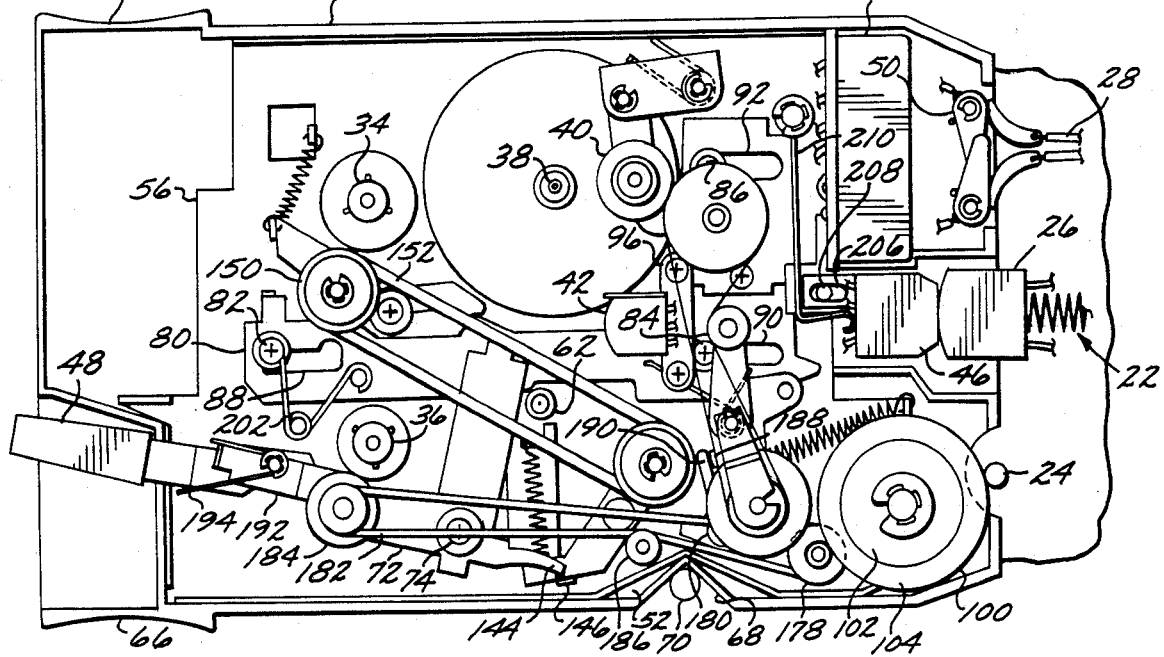
FIG. 9 is an enlarged top plan sectional view generally similar to FIG. 2, except that the mechanism is selectively positioned to rewind the tape in a cassette.
Figure 10:
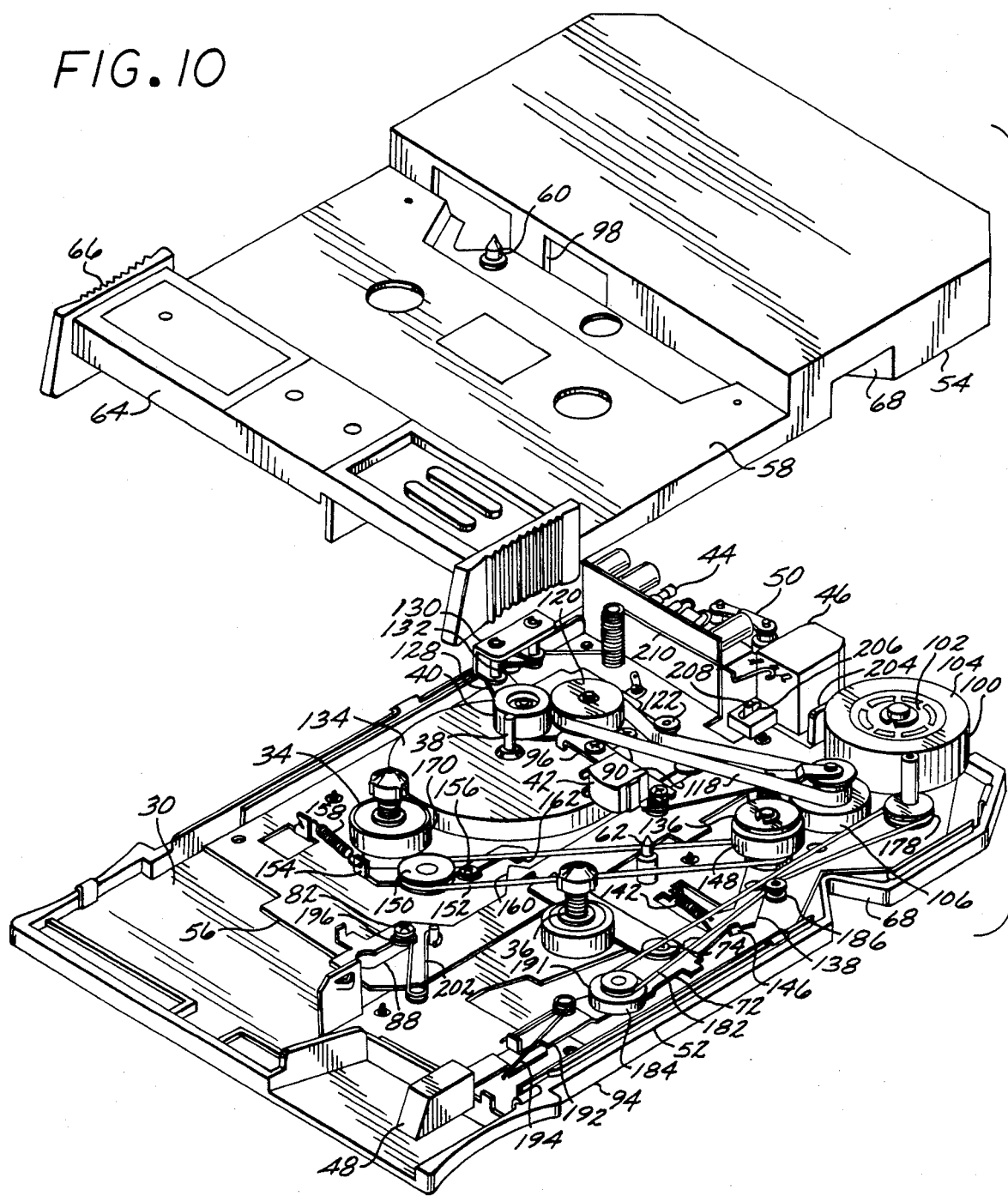
FIG. 10 is an enlarged partially exploded perspective view generally similar to FIG. 1, except that the cover of the adaptor is removed and the mechanism is selectively positioned to play a cassette tape.

The mechanical power to drive the adaptor 20 is provided by a series of mechanical elements transmitting power from the 8-track capstan 24 to the driving members of the adaptor 20. When a selector knob 48 of the adaptor 20 is moved to the "play" position as shown in FIG. 8, power from the 8-track capstan 24 is transmitted to the adaptor capstan 38 and the adaptor pinch roller 40 to drive the tape past the pickup head 42, and power is also transmitted to the takeup spindle 34 to wind the tape onto a takeup reel of the cassette 32 after being played. When the selector knob 48 is moved to the "rewind" position as shown in FIG. 9, the previously described playing drives are disconnected and a rewind drive system is engaged to drive the rewind spindle 36 to rewind the tape onto the rewind reel of the cassette 32. When the selector knob 48 is moved to the "stop" position as shown in FIG. 2, the playing and rewinding mechanisms are disengaged, and a cassette may be either inserted or removed from the adaptor 20.

The low level of electrical power required for the adaptor amplifier 44 is drawn from the 8-track tape sensor 28 through a pair of adaptor contacts 50. The 8-track tape sensor 28 ordinarily senses the end-of-tape condition in the 8-track cartridge, but in the present invention instead provides electrical power for the adaptor 20.

Turning from the above general description to a detailed description of the adaptor mechanism, the adaptor 20 includes the box-like frame 30 having a base 52 and a cover 54 for covering and protecting the electrical and mechanical components mounted to the frame 30. A metal mounting board 56 is attached to the base 52 to receive the components and to serve as a common electrical ground. A grounding plug 57 is attached to the mounting board by a clip 59. The grounding plug 57 projects downwardly through holes in the mounting board 56 and the base 52 to contact a ground in the 8-track cartridge receptacle. The cover 54 includes a cassette receiving recess 58 provided with the mechanical and electrical components necessary for interfacing with the cassette 32 to play and rewind the tape in the cassette 32. The cassette 32 is received in the recess 58 upon a locating pin 60 and a grounding pin 62 engaged into corresponding holes found in the cassette 32, and the rewind and takeup reels of the cassette are respectively engaged to the rewind spindle 36 and the takeup spindle 34 of the adaptor 20. In this position, the tape passes between the adaptor capstan 38 and the adaptor pinch roller 40 which drive the tape over the pickup head 42 of the adaptor 20, whereby the magnetic patterns on the tape are converted to electrical signals.

The selector knob 48 for manually selecting a "stop", a "play" or a "rewind" function extends from a protruding end 64 of the adaptor 20, which itself extends outwardly from the 8-track player when the adaptor 20 is inserted therein. The cover 54 is provided with finger grips 66 on the protruding end 64 to aid insertion of the adaptor 20 into the 8-track cartridge receptacle, and withdrawal therefrom. A notch 68 in the base 52 and the cover 54 cooperates with a rolling element 70 of the 8-track player for limiting the extent of insertion of the adaptor 20 into the 8-track cartridge receptacle and for holding the adaptor 20 in place after insertion.

The selector knob 48 operates a linkage for selectively disengaging and engaging the mechanical components required to allow loading, playing and rewinding of the tape cassette 32. The selector knob 48 is attached to a generally L-shaped activation link 72, pivotally mounted to the mounting board 56 by an activation link pivot pin 74. A hook 76 in the leg of the activation link 72 remote from the selector knob loosely engages a slot 78 in a central link 80, which is also generally L-shaped. The central link 80 is fastened to the mounting board 56 by three screws 82, 84, and 86 passing through three slots 88, 90, and 92, respectively, in the central link 80. The three slots 88, 90, and 92 are each elongated parallel to a long side 94 of the adaptor frame 30, so that the central link 80 is constrained to slide parallel to the long side 94 under the urging of the activation link 72 as it pivots when the selector knob 48 is moved.

The pick-up head 42 is rigidly fastened to the central link by a pick-up head mounting bracket 96. With the selector knob 48 in the stop or rewind positions, the pick-up head 42 is retracted within the cover 54 of the adaptor 20. When the selector knob 48 is moved to the play position (as shown in FIG. 8), rotation of the activation link 72 slides the central link 80 toward the protruding end 64, so that the pick-up head 42 translates toward the protruding end 64 and out of the cover 54 through an opening 98 therein. In this position, a length of the tape in the tape cartridge 32 rests against the pickup head 42, and the pick-up head 42 can read the magnetically recorded information on the tape as the tape is moved over the pick-up head 42.

Mechanical power is transferred from the 8-track capstan 24 into the adaptor 20 by the peripheral contact between a main drive wheel 100 mounted to the adaptor base 52 and the rotationally driven 8-track capstan 24. The main drive wheel 100 includes a central wheel 102 with a rubber rim 104 to ensure a good frictional contact with the 8-track capstan 24. When the selector knob 48 of the adaptor 20 is in the stop position shown in FIGS. 1 and 2, the main drive wheel 100 is not contacted by any further driving components of the adaptor 20, so that the main drive wheel 100 is driven by the 8-track capstan 24 but does not transmit this rotational motion further.

Movement of the central link 80 toward the protruding end 64 as the selector knob 48 is moved to the play position also engages a forward drive take-off pulley 106 to the main drive wheel 100, thereby engaging the drive mechanism for the adaptor pinch roller 40 and the adaptor capstan 38 to the 8-track capstan 24. The forward drive takeoff pulley 106 is rotationally mounted to a forward drive takeoff mounting link 108. This link 108 is itself pivotally mounted by a forward drive takeoff mounting link pivot pin 110 to the mounting board 56, and is biased in a counter-clockwise direction as shown in FIG. 9 by a forward drive take-off mounting link tensioning spring 112 to bias the forward drive take-off pulley 106 into peripheral contact with the main drive wheel 100. Contact between the pulley 106 and the wheel 100 is disengaged when the selector knob 48 is moved to the stop or rewind positions by a tang 114 on the central link 80 engaging a protrusion 116 on the mounting link 108 to rotate the mounting link 108 in a clockwise direction against the force of the spring 112 to move the pulley 106 out of contact with the wheel 100.

The next element in the subsystem delivering power from the 8-track capstan 24 to the adaptor pinch roller 40 and adaptor capstan 38 is a tape drive belt 118 extending from the pulley 106 to a pinch roller drive pulley 120. The belt 118 is tensioned by a drive idler wheel 122 rotationally mounted to an idler arm 124. The idler arm 124 is pivotally mounted to the mounting board 56 and biased in a counter-clockwise direction by a coil spring 126 to force the idler wheel 122 against the belt 118 to take up any slack therein.

The adaptor pinch roller 40 is rotationally mounted to a pinch roller arm 128, which is itself pivotally mounted to a pinch roller support 130. The support 130 is biased by a coil spring 132 in a counter-clockwise direction to force the pinch roller 40 into contact with the tape drive belt 118 as it passes over the pinch roller drive pulley 120, so that as the forward drive take-off pulley 106 is rotated the pinch roller 40 rotates. When the selector knob 48 is in the stop position, the tape in the cassette lies loosely between the pinch roller 40 and the capstan 38. As the selector knob 48 is moved to the play position, the tape is captured between the pinch roller 40 and the capstan 38, and is driven by the motion of the pinch roller 40 transmitted from the main drive wheel 100. The adaptor capstan 38 rotates as a result of the frictional contact with the pinch roller 40 through the moving tape. A flywheel 134 attached to the base of the adaptor capstan 38 rotates with the capstan 38 and tends to stabilize its angular rotational velocity due to the momentum of the flywheel 134, thereby promoting a uniform tape speed past the pickup head 42 even though minor variations in angular velocity of the drive system may be expected to occur because some of the elements are rubber, the possibility of a slight stretching of the drive belt 118, or other reasons.

Counter-clockwise rotation of the activation link 72 when the selector knob 48 is moved to the play position also engages components to drive the takeup spindle 34 to wind the tape onto the takeup reel of the cassette 32 after the tape passes between the capstan 38 and the pinch roller 40. A takeup receiver pulley 136 is rotationally mounted to a takeup link 138, itself pivotally mounted to the base 56 by a takeup link pivot pin 140. The takeup link 138 is biased in a clockwise direction by a tensioning spring 142 to engage the takeup receiver pulley 136 to the forward drive takeoff pulley 106. With the selector knob 48 in the stop or rewind positions, an extension 144 of the activation link 72 contacts a tongue 146 on the takeup link 138, thereby urging the takeup link 138 to rotate in a counter-clockwise direction against the force of the spring 142 to move the takeup receiver pulley 136 out of contact with the forward drive takeoff pulley 106. Conversely, movement of the selector knob 48 to the play position rotates the activation link 72 in a counter-clockwise direction to disengage the extension 144 and the tongue 146 so that the takeup receiver pulley 136 rotates in a clockwise direction to peripherally contact the forward drive takeoff pulley 106. Preferably, the takeup receiver pulley 136 has a rubber rim 148 to ensure a non-slipping contact with the forward drive takeoff pulley 106. Rotation of the takeup receiver pulley 136 rotates the takeup drive pulley 160 by means of a rubber takeup drive belt 152 extending from the receiver pulley 136 to the drive pulley 150.

The takeup drive pulley 150 is rotationally mounted to a takeup link 154, itself pivotally mounted by means of a takeup link pin 156 to the base 56. The takeup link 154 is biased in a clockwise direction by a takeup drive tensioning spring 158, to urge the takeup drive pulley 150 toward contact with the takeup spindle 34. With the selector knob 48 in the stop or rewind positions, a tang 160 on the central link 80 contacts a tongue 162 on the takeup link 154 to force the takeup link 154 to rotate in a counter-clockwise direction against the force of the spring 158, thereby rotating the takeup drive pulley 150 away from engagement with the takeup spindle 34. Conversely, when the central link 80 is moved toward the protruding end as the selector knob 48 is moved to the play position, the tang 160 disengages the tongue 162 to allow the spring 158 to rotate the takeup link 154 clockwise. This rotation brings the takeup drive belt 152 into contact with the takeup spindle 34 as the belt 152 passes over the pulley 150, thence turning the spindle 34 and winding the tape onto the takeup reel of the cassette 32.

The takeup spindle 34 incorporates a clutching design so that overly large tensions cannot be placed upon the tape as it is wound onto the takeup reel, which might stretch or break the tape. As illustrated in FIG. 6, the spindle 34 is mounted to the base 56 with an axle 164 extending upwardly through the center of the spindle 34. An annular housing 166 fits over and turns on the axle 164, and the annular housing 166 has a diametrically enlarged clutch plate 168 extending outwardly from its base. Positioned over the annular housing 166 is a diametrically enlarged driven housing 170, whose outer periphery is directly contacted and driven by the take-up drive belt 152 as it passes over the take-up drive pulley 150. Between the clutch plate 168 and the diametrically enlarged portion of the driven housing 170 is an annular felt pad 172 allowing slippage between the clutch plate 168 and the driven housing 170 when the torque applied to the driven housing 170 exceeds a predetermined value. A cap 174 is threadably engaged to the upper end of the annular housing 166 and retains a coil spring 176 pressing downwardly against the driven housing 170. The downward force of the coil spring 176 determines the total force between the driven housing 170, the felt pad 172, and the clutch plate 168, so that increasing the force exerted by the coil spring 176 increases the torque required before the clutch slips. By adjusting the cap 174 or the spring constant of the coil spring 176, the proper torque may be determined so that sufficient tension is placed upon the tape to wind the tape onto the take-up reel, but an overly large tension that might stretch or break the tape is avoided.

When the selector knob 48 is moved to the rewind position, the previously described mechanical components associated with the playing of the tape are disengaged from the 8-track capstan 24 as described above, and a mechanism is engaged to drive the rewind spindle 36 to rewind the tape onto the rewind reel of the cassette 32. A rewind drive takeoff pulley 178 is rotationally mounted to a rewind link 180, which is itself pivotally mounted to the base 56. A rubber rewind drive belt 182 passes over the rewind drive takeoff pulley 178 and a rewind spindle drive pulley 184, so that rotational movement of the rewind drive takeoff pulley 178 rotates the rewind spindle drive pulley 184. A rewind idler pulley 186 tensions the rewind drive belt 182, and this tension acts through the rewind drive takeoff pulley 178 to bias the rewind link 180 in a clockwise direction, thus rotating the rewind drive takeoff pulley 178 away from contact with the main drive wheel 100. When the selector knob 48 is moved to the rewind position, the rewind link 180 is rotated in a counter-clockwise fashion to contact the rewind drive takeoff pulley 178 to the main drive wheel 100 by the force of a tab 188 on the forward drive take-off mounting link 108 pressing against a tongue 190 of the rewind link 180. The tab 188 presses against the tongue 190 as the forward drive takeoff mounting link 108 is rotated in a clockwise direction under the force of the central link 80 as the selector knob 48 is moved to the rewind position, as previously described.

Placing of the selector knob 48 in the rewind position also moves a rubber-covered portion 191 of the rewind spindle drive pulley 184 into contact with the rewind spindle 36, so that the rewind spindle 36 may be rotated. The rewind spindle drive pulley 184 is rotationally mounted to a rewind pulley link 192, itself pivotally mounted to the activation link 72. A rewind hairpin spring 194 biases the rewind pulley link 192 in a counter-clockwise direction against the activation link 72. Movement of the selector knob 48 to the rewind position contacts the rewind spindle drive pulley 184 to the rewind spindle 36, thereby rotating the rewind pulley link 192 in a clockwise direction against the counter-clockwise biasing force of the hairpin spring 194 so that the rewind spindle drive pulley 184 is held in firm frictional peripheral contact with the rewind spindle 36. The rewind spindle 36 is of a clutching design, as described previously in relation to FIG. 6 for the takeup spindle 34.

Figure 7:
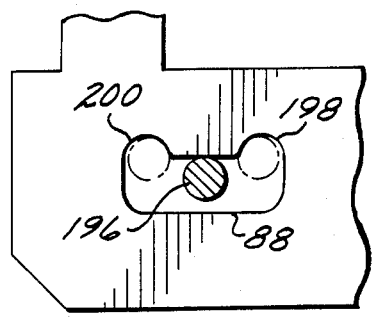
FIG. 7 is an enlarged fragmented detail view of a portion of FIG. 2, illustrating the overcenter cutout portion of the mechanical linkage.

When the selector knob 48 is placed into the play or rewind positions, the knob 48 and the adaptor mechanism should remain in that selected position until manually or automatically removed from that position, and an overcenter locking mechanism is provided for that purpose. An overcenter pin 196 is provided as a bushing placed over, and held in the slot 88 by, the screw 82. As seen in FIG. 7, a pair of cut-out lobes 198 and 200 are shaped at either end of the slot 88 to lockably receive the overcenter pin 196. An overcenter hairpin spring 202 joined to the overcenter pin 196 and to the central link 80 biases the overcenter pin 196 toward the longitudinal center of the elongated slot 88. Movement of the selector knob 48 toward either the play or rewind positions moves the slot 88 relative to the pin 196 against the force of the hairpin spring 202, until the pin 196 slips into either the play lobe 198 or the rewind lobe 200. The strength of the overcenter hairpin spring 202 is itself not sufficient to force the pin 196 out of the lobes 198 or 200, with the result that the pin 196 is lockably engaged in one lobe until sufficient force is applied to the central link 80 to snap the pin 196 out of the lobe 198 or 200 and back to the longitudinal center of the slot 88. Sufficient force may be supplied either by manual movement of the selector knob 48, or by an autostop mechanism to be described next.

An autostop feature is provided in the adaptor 20 to return the selector knob 48 and the mechanism to the stop position when the tape is finished and fully wound onto the takeup reel. When the selector knob 48 is placed in the play position, as previously described the pickup head 42 is advanced outwardly through the opening 98 in the cover 54 to contact the tape in the cassette 32. The extent of movement of the pickup head 42 is sufficient to bow the tape slightly to ensure good contact between the tape and the pick-up head 42. When the tape is completed and transferred in the cassette 32 from the rewind reel to the takeup reel, the displacement of the tape by the pickup head 42 creates a disengaging force acting to urge the pickup head 42 backwardly to return into the cover 54. When added to the force of the overcenter hairpin spring 202, this disengaging force against the pickup head 42 is sufficient to snap the pin 88 out of the play lobe 198, thereby returning the mechanism and the selector knob 48 to the stop position so that the drive mechanism is no longer functioning.

In playing a tape, the pickup head 42 converts a magnetic pattern of impulses on the tape to electrical signals which are amplified in an amplifier 44 and transmitted to the adaptor magnetic coupler 46, wherein the electrical signals are converted back to magnetic signals. The magnetic coupler 46 resides in a passageway 204 formed by the base 52 and the cover 54 so that the magnetic coupler 46 is constrained to slide along the passageway 204. The housing of the magnetic coupler 46 includes a slot 206 received upon a pin 208 extending upwardly from the base 52, further constraining the magnetic coupler to slide longitudinally within the passageway 204. A tensioning spring 210 anchored to the mounting board 56 biases the magnetic coupler 46 outwardly in the passageway 204 and into contact with the 8-track tape playback head 26. The magnetic signals produced by the magnetic coupler 46 are sensed by the 8-track tape playback head 26 as though the magnetic coupler 46 were an 8-track tape being played over the 8-track tape playback head 26.

Figure 11:
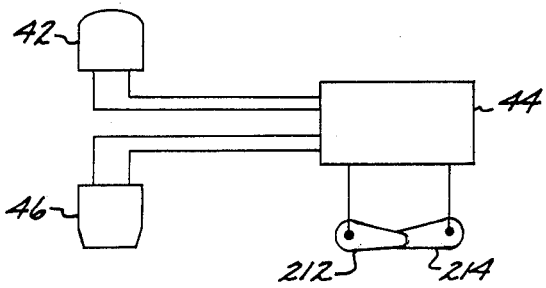
FIG. 11 is a schematic representation of the electronic system of the adaptor.

The amplifier 44 for amplifying the signal from the pickup head 42 to the magnetic coupler 46 is of conventional design, as shown schematically in FIG. 11. A signal from the pickup head 42 is delivered by wires to the conventional amplifier 44 and the amplified signal is transmitted by wires to the magnetic coupler 46.

Power for the amplifier 44 is provided from the 8-track tape sensor 28 through a pair of adaptor contacts 50 engaging a pair of 8-track sensor contacts 212. The 8-track tape sensor 28 is ordinarily used by the 8-track unit to sense an end-of-tape condition to switch tracks or to automatically turn off the 8-track player. On 8-track tapes, a metallic layer of sufficient length to simultaneously contact the two 8-track sensor contacts 212 is provided at the end of the tape, so that when the metallic strip extends between the contacts 212, a current of approximately 150 milliamps flows through the tape sensor 28 and is detected by the electronics of the tape player and sensed as an end-of-tape condition. However, low current levels through the 8-track tape sensor 28 are not sufficient to be detected as an end-of-tape condition. In particular, low currents on the order of approximately 7 milliamps required to power the amplifier 44 are not sensed as an end-of-tape condition by the 8-track tape sensor, so that this low current level may be drawn from the 8-track tape sensor directly without causing the tape player to be turned off automatically.

To conduct the low current level from the 8-track tape sensor 28 to the amplifier 44, the adaptor contacts 50 engage the 8-track sensor contacts 212. As shown in detail in FIG. 3, the pair of 8-track adaptor contacts 50 are mounted at the top of a pair of posts 214 and 216 attached to the adaptor base 52. A pair of coil tensioning springs 218 and 220 bias the adaptor contacts 50 outwardly and against the corresponding 8-track sensor contacts 212.

Cassette tapes may be played by inserting the tapes into the cassette receiving recess 58 of the adaptor 20 with the selector knob 48 in the stop position, and then inserting the adaptor 20 into the 8-track receptacle until the adaptor 20 is in contact with the elements at the rear wall of the receptacle. In this position, the main drive wheel 100 contacts the 8-track capstan 24 to receive rotational power therefrom to drive the mechanical elements of the adaptor 20. The adaptor contacts 50 are engaged to the 8-track sensor contacts 212 to draw electrical power for the amplifier 44 from the 8-track tape sensor 28. The adaptor magnetic coupler 46 is biased outwardly into contact with the 8-track tape playback head 26 to transmit the signals from the adaptor pick-up head 42 to the electronics and speakers of the 8-track player, which must be turned on before playing the tape. To play the tape, the selector knob 48 is moved to the play position to activate the drive mechanism for the adaptor pinch roller 40 and the adaptor capstan 38, and simultaneously activate the mechanism for driving the takeup spindle 34. At the end of the tape, the two drive mechanisms are automatically disengaged by the autostop mechanism acting to disengage the overcenter pin 196 from the play lobe 198. To rewind the tape, the selector knob 48 is placed in the rewind position to engage a rewind mechanism to drive the rewind spindle 36 and simultaneously to disengage the two drive mechanisms operable when the tape is played.

It will now be appreciated that, through the use of this invention, cassette tapes may be played in an 8-track tape player using an adaptor driven entirely by the externally available mechanical and electrical power sources of the 8-track tape player. This approach reduces the size, cost and installation time of the adaptor. Although a particular embodiment of the invention has been described in detail for purposes of illustration, various modifications may be made without departing from the spirit and scope of the invention. Accordingly, the invention is not to be limited except as by the appended claims.

I claim:

1. For use in a cassette adaptor, a tape transport mechanism, operable from the driven capstan of an 8-track tape player, for transporting tape from a rewind reel to a takeup reel and for later rewinding the tape, the mechanism comprising:

a main drive wheel, said wheel contacting the capstan of the 8-track tape player; and linkage means selectively operable to alternatively engage said main drive wheel with tape playing means for transporting the tape past a pickup head;

engage said main drive wheel with rewind drive means for rewinding the tape; and disengage said main drive wheel from both the tape playing means and the rewind means.

2. The mechanism of claim 1 wherein the tape playing drive means includes:

a forward drive takeoff pulley peripherally contacting said main drive wheel;

a capstan and a pinch roller disposed for capturing the tape therebetween and driving the tape;

a pinch roller drive pulley peripherally contacting said pinch roller; and a tape drive belt transmitting power from said forward drive takeoff pulley to said pinch roller drive pulley, whereby said capstan and said pinch roller are rotated to drive the tape when said linkage means is operated to engage said tape playing means to said main drive wheel.

3. The mechanism of claim 2, wherein said tape playing drive means further includes a flywheel connected to said capstan, said flywheel acting to promote uniform forward movement of the tape.

4. The mechanism of claim 3, wherein said tape playing means includes:

a takeup spindle to receive the takeup reel; and takeup means for rotating said takeup spindle, said takeup means receiving power from said main drive wheel when said linkage means is operated to engage said tape playing means.

5. The mechanism of claim 4, wherein said takeup means further comprises:

a forward drive takeoff pulley peripherally adjacent said main drive wheel, said forward drive takeoff pulley being disposed to contact said main drive wheel when said linkage means is operated to engage said tape playing means to said main drive wheel;

a takeup receiver pulley peripherally adjacent said forward drive takeoff pulley, said takeup receiver pulley being disposed to contact said forward drive takeoff pulley when said linkage means is operated to engage said tape playing means to said main drive wheel;

a takeup drive pulley peripherally adjacent said takeup spindle, said takeup drive pulley being disposed to contact said takeup spindle when said linkage means is operated to engage said tape playing means to said main drive wheel; and a takeup drive belt, said belt extending from said takeup receiver pulley to said takeup drive pulley, whereby said takeup spindle is rotated when said linkage means is operated to engage said tape playing means to said main drive wheel.

6. The mechanism of claim 1, wherein said rewind drive means comprises:

a rewind spindle to receive the rewind reel;

rewind drive means for rotating said rewind spindle to rewind the tape, said rewind means receiving power from said main drive wheel when said linkage means is operated to engage said rewind means.

7. The mechanism of claim 6, wherein said rewind drive means comprises:

a rewind drive takeoff pulley peripherally adjacent said main drive wheel, said rewind drive takeoff pulley being disposed to contact said main drive wheel when said linkage means is operated to engage said rewind means to said main drive wheel;

a rewind spindle drive pulley peripherally adjacent said rewind spindle, said rewind spindle drive pulley being disposed to contact said rewind spindle when said linkage means is operated to engage said rewind means to said main drive wheel; and a rewind drive belt, said belt extending from said rewind drive takeoff pulley to said rewind spindle drive pulley, whereby said rewind spindle is rotated to rewind the tape when said linkage means is operated to engage said rewind means to said main drive wheel.

8. The mechanism of claim 1, said linkage means further comprising retention means for holding said linkage means in its selectively operable playing and rewinding positions.

9. The mechanism of claim 8, wherein said retention means comprises:

an overcenter slot in said linkage means, said overcenter slot having two lobes and an unlobed region therebetween;

an overcenter pin extending through said slot and dimensioned to fit into either of the two lobes;

a spring connecting said overcenter pin to said linkage means, said spring biasing said overcenter pin toward said unlobed region, whereby the linkage means is held in its alternatively operable playing and rewinding positions until forced out of the positions.

10. The mechanism of claim 1, said linkage means further comprising autostop means for automatically disengaging said tape playing means when the end of the tape is reached.

11. The mechanism of claim 10, wherein said autostop means comprises:

retention means for holding said linkage means in its selectively operable playing position until such time as a disengaging force is applied to said linkage means; and a tape pickup head attached to said linkage means, said pickup head touching the tape as it is played, and bowing the tape so that the tape exerts a disengaging force when the end of the tape is reached.

12. For use with an 8-track tape player having a cartridge receptacle and a capstan, tape playback head and tape sensor therein, an adaptor for playing a tape cassette, comprising:

a frame for receiving the tape cassette, said frame being dimensionally compatible with the 8-track cartridge receptacle so that said frame may be inserted into the receptacle;

a pickup head in said frame, said pickup head being positioned to sense a signal from a cassette tape as the tape is moved past said pickup head;

drive means in said frame for driving the cassette tape in a forward direction past said pickup head to play the tape, said drive means including means coupled to the capstan of the 8-track tape player; and electronic means in said frame for amplifying the signal sensed by said pickup head and for transmitting the altered signal to the 8-track tape reading head, said electronic means receiving all of the power for its operation from the tape sensor of the 8-track tape player.

13. For use with an 8-track tape player having a cartridge receptacle and a capstan, tape playback head and tape sensor therein, an adaptor for playing a tape cassette, comprising:

a frame for receiving the tape cassette, said frame being dimensionally compatible with the 8-track cartridge receptacle so that said frame may be inserted into the receptacle;

a pickup head in said frame, said pickup head being positioned to sense a signal from a cassette tape as the tape is moved past said pickup head;

drive means in said frame for driving the cassette tape in a forward direction past said pickup head to play the tape, said drive means including means coupled to the capstan of the 8-track tape player and further including rewind means for driving the cassette tape in a reverse direction to rewind the tape; and electronic means in said frame for amplifying the signal sensed by said pickup head and for transmitting the altered signal to the 8-track tape reading head, said electronic means receiving power from the 8-track tape player.

14. For use with an 8-track tape player having a cartridge receptacle and a capstan, tape playback and tape sensor therein, an adaptor for playing a tape cassette, comprising:

a frame for receiving the tape cassette, said frame being dimensionally compatible with the 8-track cartridge receptacle so that said frame may be inserted into the receptacle;

a pickup head in said frame, said pickup head being positioned to sense a signal from a cassette tape as the tape is moved past said pickup head;

drive means said frame for driving the cassette tape in a forward direction past said pickup head to play the tape, said drive means including means coupled to the capstan of the 8-track tape player and further including rewind means for driving the cassette tape in a reverse direction to rewind the tape; and electronic means in said frame for amplifying the signal sensed by said pickup head and for transmitting the altered signal to the 8-track tape reading head, said electronic means receiving power from the tape sensor of the 8-track tape player.

* * * * *